(12) United States Patent
O'Brien et al.

(10) Patent No.: US 12,237,773 B2
(45) Date of Patent: *Feb. 25, 2025

(54) MULTI-PHASE PULSE POWER SHORT REACH DISTRIBUTION

(71) Applicant: Cisco Technology, Inc., San Jose, CA (US)

(72) Inventors: Richard Anthony O'Brien, Livermore, CA (US); Joel Richard Goergen, Soulsbyville, CA (US); Chad M. Jones, Doylestown, OH (US); Jason DeWayne Potterf, Austin, TX (US); George Allan Zimmerman, Manhattan Beach, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,915

(22) Filed: Dec. 13, 2023

(65) Prior Publication Data

US 2024/0113625 A1 Apr. 4, 2024

Related U.S. Application Data

(63) Continuation of application No. 18/166,159, filed on Feb. 8, 2023, now Pat. No. 11,909,320, which is a
(Continued)

(51) Int. Cl.
*H02M 3/158* (2006.01)
*G06F 1/18* (2006.01)
*H02J 1/10* (2006.01)

(52) U.S. Cl.
CPC ............ *H02M 3/1584* (2013.01); *G06F 1/18* (2013.01); *H02J 1/106* (2020.01); *H02M 3/1586* (2021.05)

(58) Field of Classification Search
CPC ..... H02M 3/1584; H02M 3/1586; G06F 1/18; H02J 1/106
See application file for complete search history.

(56) References Cited

U.S. PATENT DOCUMENTS

| 3,335,324 A | 8/1967 | Buckeridge |
|---|---|---|
| 4,811,187 A | 3/1989 | Nakajima |

(Continued)

FOREIGN PATENT DOCUMENTS

| CN | 1209880 C | 7/2005 |
|---|---|---|
| CN | 201689347 U | 12/2010 |

(Continued)

OTHER PUBLICATIONS

"Audio/video, information and communication technology equipment—Part 1: Safety requirements," International Standard, IEC 62368-1, Edition 2.0, Feb. 2014, pp. 264-387, 124 pages.
(Continued)

*Primary Examiner* — Rafael O De Leon Domenech

(57) ABSTRACT

In one embodiment, a method includes transmitting multi-phase pulse power from power sourcing equipment to a powered device in a data center, wherein the multi-phase pulse power comprises multiple phases of power delivered in a sequence of pulses defined by alternating low direct current voltage states and high direct current voltage states, and synchronizing the pulses at the power sourcing equipment with the pulses at the powered device.

22 Claims, 13 Drawing Sheets

Related U.S. Application Data continuation of application No. 16/805,580, filed on Feb. 28, 2020, now Pat. No. 11,637,497.

(56) References Cited

U.S. PATENT DOCUMENTS

| | | |
|---|---|---|
| 4,997,388 A | 3/1991 | Dale |
| 5,652,893 A | 7/1997 | Ben-Meir |
| 6,008,631 A | 12/1999 | Johari |
| 6,220,955 B1 | 4/2001 | Posa |
| 6,259,745 B1 | 7/2001 | Chan |
| 6,636,538 B1 | 10/2003 | Stephens |
| 6,685,364 B1 | 2/2004 | Brezina |
| 6,784,790 B1 | 8/2004 | Lester |
| 6,826,368 B1 | 11/2004 | Koren |
| 6,855,881 B2 | 2/2005 | Khoshnood |
| 6,860,004 B2 | 3/2005 | Hirano |
| 7,325,150 B2 | 1/2008 | Lehr |
| 7,420,355 B2 | 9/2008 | Liu |
| 7,490,996 B2 | 2/2009 | Sommer |
| 7,492,059 B2 | 2/2009 | Peker |
| 7,509,505 B2 | 3/2009 | Randall |
| 7,566,987 B2 | 7/2009 | Black et al. |
| 7,583,703 B2 | 9/2009 | Bowser |
| 7,589,435 B2 | 9/2009 | Metsker |
| 7,593,747 B1 | 9/2009 | Karam |
| 7,603,570 B2 | 10/2009 | Schindler |
| 7,616,465 B1 | 11/2009 | Vinciarelli |
| 7,813,646 B2 | 10/2010 | Furey |
| 7,835,389 B2 | 11/2010 | Yu |
| 7,854,634 B2 | 12/2010 | Filipon |
| 7,881,072 B2 | 2/2011 | DiBene |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,068,937 B2 | 11/2011 | Eaves |
| 8,081,589 B1 | 12/2011 | Gilbrech |
| 8,184,525 B2 | 5/2012 | Karam |
| 8,276,397 B1 | 10/2012 | Carlson |
| 8,279,883 B2 | 10/2012 | Diab |
| 8,310,089 B2 | 11/2012 | Schindler |
| 8,319,627 B2 | 11/2012 | Chan |
| 8,345,439 B1 | 1/2013 | Goergen |
| 8,350,538 B2 | 1/2013 | Cuk |
| 8,358,893 B1 | 1/2013 | Sanderson |
| 8,638,008 B2 | 1/2014 | Baldwin et al. |
| 8,700,923 B2 | 4/2014 | Fung |
| 8,712,324 B2 | 4/2014 | Corbridge |
| 8,750,710 B1 | 6/2014 | Hirt |
| 8,768,528 B2 | 7/2014 | Millar et al. |
| 8,781,637 B2 | 7/2014 | Eaves |
| 8,787,775 B2 | 7/2014 | Earnshaw |
| 8,829,917 B1 | 9/2014 | Lo |
| 8,836,228 B2 | 9/2014 | Xu |
| 8,842,430 B2 | 9/2014 | Hellriegel |
| 8,849,471 B2 | 9/2014 | Daniel |
| 8,966,747 B2 | 3/2015 | Vinciarelli |
| 9,019,895 B2 | 4/2015 | Li |
| 9,024,473 B2 | 5/2015 | Huff |
| 9,184,795 B2 | 11/2015 | Eaves |
| 9,189,036 B2 | 11/2015 | Ghoshal |
| 9,189,043 B2 | 11/2015 | Vorenkamp |
| 9,273,906 B2 | 3/2016 | Goth |
| 9,319,101 B2 | 4/2016 | Lontka |
| 9,321,362 B2 | 4/2016 | Woo |
| 9,373,963 B2 | 6/2016 | Kuznelsov |
| 9,419,436 B2 | 8/2016 | Eaves |
| 9,484,771 B2 | 11/2016 | Braylovskiy |
| 9,510,479 B2 | 11/2016 | Vos |
| 9,531,551 B2 | 12/2016 | Balasubramanian |
| 9,590,811 B2 | 3/2017 | Hunter, Jr. |
| 9,618,714 B2 | 4/2017 | Murray |
| 9,640,998 B2 | 5/2017 | Dawson |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes, Jr |
| 9,893,521 B2 | 2/2018 | Lowe |
| 9,948,198 B2 | 4/2018 | Imai |
| 9,979,370 B2 | 5/2018 | Xu |
| 9,985,600 B2 | 5/2018 | Xu |
| 10,007,628 B2 | 6/2018 | Pitigoi-Aron |
| 10,028,417 B2 | 7/2018 | Schmidtke |
| 10,128,764 B1 | 11/2018 | Vinciarelli |
| 10,248,178 B2 | 4/2019 | Brooks |
| 10,263,526 B2 | 4/2019 | Sandusky et al. |
| 10,407,995 B2 | 9/2019 | Moeny |
| 10,439,432 B2 | 10/2019 | Eckhardt |
| 10,468,879 B2 | 11/2019 | Eaves |
| 10,541,543 B2 | 1/2020 | Eaves |
| 10,541,758 B2 | 1/2020 | Goergen |
| 10,631,443 B2 | 4/2020 | Byers |
| 10,672,537 B2 | 6/2020 | Goergen |
| 10,714,930 B1 | 7/2020 | Weiss et al. |
| 10,732,688 B2 | 8/2020 | Goergen |
| 10,735,105 B2 | 8/2020 | Goergen et al. |
| 10,809,134 B2 | 10/2020 | Bullock |
| 10,958,471 B2 | 3/2021 | Goergen |
| 11,637,497 B2 | 4/2023 | O'Brien et al. |
| 11,909,320 B2 * | 2/2024 | O'Brien ............ H02M 3/1584 |
| 2001/0024373 A1 | 9/2001 | Cuk |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2004/0264214 A1 | 12/2004 | Xu |
| 2005/0197018 A1 | 9/2005 | Lord |
| 2005/0268120 A1 | 12/2005 | Schindler |
| 2006/0202109 A1 | 9/2006 | Delcher |
| 2006/0209875 A1 | 9/2006 | Lum |
| 2007/0103168 A1 | 5/2007 | Batten |
| 2007/0143508 A1 | 6/2007 | Linnman |
| 2007/0236853 A1 | 10/2007 | Crawley |
| 2007/0253382 A1 | 11/2007 | Ghassemzadeh et al. |
| 2007/0263675 A1 | 11/2007 | Lum |
| 2007/0284946 A1 | 12/2007 | Robbins |
| 2007/0288125 A1 | 12/2007 | Quaratiello |
| 2008/0054720 A1 | 3/2008 | Lum |
| 2008/0198635 A1 | 8/2008 | Hussain |
| 2008/0229120 A1 | 9/2008 | Diab |
| 2008/0310067 A1 | 12/2008 | Diab |
| 2010/0052421 A1 | 3/2010 | Schindler et al. |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0237846 A1 | 9/2010 | Vetteth |
| 2010/0290190 A1 | 11/2010 | Chester |
| 2011/0004773 A1 | 1/2011 | Hussain |
| 2011/0007664 A1 | 1/2011 | Diab |
| 2011/0083824 A1 | 4/2011 | Rogers |
| 2011/0228578 A1 | 9/2011 | Serpa |
| 2011/0266867 A1 | 12/2011 | Schindler |
| 2011/0290497 A1 | 12/2011 | Stenevik |
| 2012/0064745 A1 | 3/2012 | Ottliczky |
| 2012/0170927 A1 | 7/2012 | Huang |
| 2012/0201089 A1 | 8/2012 | Barth |
| 2012/0231654 A1 | 9/2012 | Conrad |
| 2012/0287984 A1 | 11/2012 | Lee |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Weem |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2013/0329344 A1 | 12/2013 | Tucker |
| 2014/0111180 A1 | 4/2014 | Madan |

(56) References Cited

U.S. PATENT DOCUMENTS

| | | |
|---|---|---|
| 2014/0126151 A1 | 5/2014 | Campbell |
| 2014/0129850 A1 | 5/2014 | Paul |
| 2014/0258738 A1 | 9/2014 | Greenwalt et al. |
| 2014/0258742 A1 | 9/2014 | Chien |
| 2014/0258813 A1 | 9/2014 | Lusted |
| 2014/0265550 A1 | 9/2014 | Milligan |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0207317 A1 | 7/2015 | Radermacher |
| 2015/0215001 A1 | 7/2015 | Eaves |
| 2015/0215131 A1 | 7/2015 | Paul |
| 2015/0333918 A1 | 11/2015 | White, III |
| 2015/0340818 A1 | 11/2015 | Scherer |
| 2016/0020911 A1 | 1/2016 | Sipes, Jr. |
| 2016/0064938 A1 | 3/2016 | Balasubramanian |
| 2016/0111877 A1 | 4/2016 | Eaves |
| 2016/0118784 A1 | 4/2016 | Saxena |
| 2016/0133355 A1 | 5/2016 | Glew |
| 2016/0134331 A1 | 5/2016 | Eaves |
| 2016/0142217 A1 | 5/2016 | Gardner |
| 2016/0188427 A1 | 6/2016 | Chandrashekar |
| 2016/0197600 A1 | 7/2016 | Kuznetsov |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo |
| 2016/0294568 A1 | 10/2016 | Chawgo et al. |
| 2016/0308683 A1 | 10/2016 | Pischl |
| 2016/0352535 A1 | 12/2016 | Hiscock |
| 2016/0365967 A1 | 12/2016 | Tu |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0155518 A1 | 6/2017 | Yang |
| 2017/0164525 A1 | 6/2017 | Chapel |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0294966 A1 | 10/2017 | Jia |
| 2017/0325320 A1 | 11/2017 | Wendt |
| 2018/0024964 A1 | 1/2018 | Mao |
| 2018/0048713 A1 | 2/2018 | Brine |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2018/0340840 A1 | 11/2018 | Bullock et al. |
| 2019/0089467 A1 | 3/2019 | Goergen et al. |
| 2019/0267804 A1 | 8/2019 | Matan |
| 2019/0272011 A1 | 9/2019 | Goergen |
| 2019/0280895 A1 | 9/2019 | Mather |
| 2019/0363493 A1 | 11/2019 | Sironi |
| 2020/0382198 A1 | 12/2020 | Ashrafi |
| 2021/0408822 A1 | 12/2021 | Arduini et al. |
| 2022/0190587 A1 | 6/2022 | Eaves et al. |

FOREIGN PATENT DOCUMENTS

| | | |
|---|---|---|
| CN | 204836199 U | 12/2015 |
| CN | 205544597 U | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2257009 A2 | 1/2010 |
| EP | 2693688 A1 | 2/2014 |
| WO | 199316407 A1 | 8/1993 |
| WO | 2010053542 A2 | 5/2010 |
| WO | 2017054030 A1 | 4/2017 |
| WO | 2017167926 A1 | 10/2017 |
| WO | 2018017544 A1 | 1/2018 |
| WO | 2019023731 A1 | 2/2019 |

OTHER PUBLICATIONS

"Audio/video, information and communication technology equipment—Part 1: Safety requirements," International Standard, IEC 62368-1, Edition 2.0, Feb. 2014, pp. 388-508, 121 pages.

"Audio/video, information and communication technology equipment—Part 1: Safety requirements," International Standard, IEC 62368-1, Edition 2.0, Feb. 2014, pp. 509-593, 85 pages.

"National Electrical Code," National Fire Protection Association (NFPA) 70, 2017, 881 pages.

*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.

David A. Durfee Ph.D., "Curriculum Vitae," 4 pages.

Adel S. Sedra, "Microelectronic Circuits," Sedra/Smith, Oxford University Press, Seventh Edition, 2015, 38 pages.

Charles k. Alexander, et al., "Fundamentals of Electric Circuits," McGraw Hill Education, Indian Edition 5e, 2013, 37 pages.

Andrew S. Tanenbaum, "Computer Networks," Prentice Hall PTR, Third Edition, 1996, 12 pages.

William Stallings, "Data and Computer Communications," Macmillan Publishing Company, Fourth Edition, 1994, 14 pages.

B.P. Lathi, et al., "Modern Digital and Analog Communication Systems," Oxford University Press, Fourth Edition, 2009, 15 pages.

*Voltserver Inc.*, v. *Cisco Technology, Inc.*, "Petition for Post Grant Review of U.S. Pat. No. 10,735,105," United States Patent and Trademark Office, PGR2021-00055, Patent No. 10,735,105, Feb. 16, 2021, 132 pages.

Stephen H. Hall, et al., "High-Speed Digital System Design: A handbook of Interconnect Theory and Design Practices,", John Wiley & Sons, Inc., 2000, 55 pages.

"Understanding 802.3at, PoE Plus Standard Increases Available Power," Microsemi, Jun. 2011, 7 pages.

"Digital Electricity Gen2 Detailed Installation Manual," Voltserver Digital Electricity, Rev B.1, Nov. 29, 2017, 68 pages.

Berkeley Lab ETA, "Touch-Safe, High Voltage Digital Electricity Transmission using Packet Energy Transfer," Vimeo, https://vimeo.com/172469008, Mar. 8, 2016, 8 pages.

*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.

*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.

*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.

"Electrical—Computer Conference Proceedings," Internet Archive WayBack Machine Search for Intelec 2012, Curran Associates, Inc., http://www.proceedings.com/electrical-computer-proceedings.html, 2012, 125 pages.

(56) References Cited

OTHER PUBLICATIONS

"Part VII: A Summary of Commonly Used MARC 21 Fields, " Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.
International Search Report and Written Opinion for International Application No. PCT/US2021/017501, mailed Jun. 1, 2021, 12 Pages.
Fischer Connectors, "FiberOptic," https://www.fischerconnectors.com/US/en/products/fiberoptic, retrieved Dec. 2017, 5 pages.
Strantech, "TFOCA GenX Hybrid 2x2 Fiber Optic—Copper Connector," http://www.strantech.com/products/tfoca-genx-hybrid-2x2-fiber-optic-copper-connector/, retrieved Dec. 2017, 2 pages.
QPC, "E-Link Hybrid Connector," http://www.qpcfiber.com/product/connectors/e-link-hybrid-connector/, retrieved Dec. 2017, 4 pages.
Lumentum, "Power over Fiber," Technical Note, https://www.lumentum.com/sites/default/files/technical-library-items/poweroverfiber-tn-pv-ae_0.pdf, 2015, 8 pages.
"Network Remote Power Using Packet Energy Transfer", Eaves et al., www.voltserver.com, Sep. 2012, 5 pages.
Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.
Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.
Yencheck, "Thermal Modeling of Portable Power Cables," Report of Investigations 9463, Jan. 1993, 24 pages.
Zhang, "Machine Learning-Based Temperature Prediction for Runtime Thermal Management across System Components," IEEE Transactions on Parallel and Distribute, Mar. 2016, 15 pages.
Ashrae, "Data Center Power Equipment Thermal Guidelines and Best Practices," https://tpc.ashrae.org/FileDownload?idx=c81e88e4-998d-426d-ad24-bdedfb746178, Jun. 2016, 60 pages.
Adapa, "Dynamic Thermal Rating of Substation Terminal Equipment," https://e-cigre.org/publication/B3-108_2004-dynamic-thermal-rating-of-substation-terminal-equipment, Jan. 2004, 8 pages.
Chen, et al., "Real-Time Temperature Estimation for Power MOSFETs Considering Thermal Aging Effects," IEEE Transactions on Device and Materials Reliability, vol. 14, No. 1, Mar. 2014, 9 pages.
Jingquan Chen et al: "Buck-boost PWM converters having two independently controlled switches", 32nd Annual IEEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2, Jun. 17, 2001 (Jun. 17, 2001), pp. 736-741, XP010559317, DOI: 10.1109/PESC.2001.954206, ISBN 978-0-7803-7067-8 paragraph [SectionII]; figure 3.
Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.
Petition for Post Grant Review of U.S. Pat. No. 10,735,105 [Public], filed Feb. 16, 2021, PGR 2021-00055, 116 pages.
Petition for Post Grant Review of U.S. Pat. No. 10,735,105 [Public], filed Feb. 16, 2021, PGR 2021-00056, 132 pages.
Eaves, S. S., "Network Remote Powering Using Packet Energy Transfer," Proceedings of IEEE International Conference on Telecommunications Energy (INTELEC) 2012, Scottsdale, AZ, Sep. 30-Oct. 4, 2012 (IEEE 2012) (EavesIEEE).
Edelstein S., Updated 2016 Tesla Model S also gets new 75-kWh battery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein"), 3 pages.
NFPA 70 National Electrical Code, 2017 Edition (NEC), 881 pages.
International Standard IEC 62368-1 Edition 2.0 (2014), ISBN 978-2-8322-1405-3 ("IEC-62368"), Feb. 2014, 680 pages.
International Standard IEC/TS 60479-1 Edition 4.0 (2005), ISBN 2-8318-8096-3 ("IEC-60479"), Jul. 2005, 122 pages.
International Standard IEC 60950-1 Edition 2.2 (2013), ISBN 978-2-8322-0820-5 ("IEC-60950"), May 2013, 648 pages.
International Standard IEC 60947-1 Edition 5.0 (2014), ISBN 978-2-8322-1798-6 ("IEC-60947"), Sep. 2014, 106 pages.
Tanenbaum, A. S., "Computer Networks," Third Edition (1996) ("Tanenbaum"), 12 pages.
Stallings, W., "Data and Computer Communications," Fourth Edition ( 1994) ("Stallings"), 14 pages.
Alexander, C. K., "Fundamentals of Electric Circuits," Indian Edition (2013) ("Alexander"), 37 pages.
Hall, S. H., "High-Speed Digital System Design, A Handbook of Interconnect Theory and Design Practices" (2000) ("Hall"), Sep. 2000, 55 pages.
Sedra, A. S., "Microelectronic Circuits," Seventh Edition (2014) ("Sedra"), 38 pages.
Lathi, B. P., "Modern Digital and Analog Communication Systems," Fourth Edition (2009) ("Lathi"), 15 pages.
Microsemi, "Understanding 802.3at PoE Plus Standard Increases Available Power," (Jun. 2011) ("Microsemi"), 7 pages.
*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.
"Effects of current on human beings and livestok—Part 1: General aspects," Technical Specification, Basic Safety Publication, IEC/TS 60479-1, Edition 4.0, Jul. 2005, 122 pages.
"Information technology equipment—Safety—Part 1: General requirements," International Standard, IEC 60950-1, Edition 2.2, May 2013, pp. 1-61, 63 pages.
"Information technology equipment—Safety—Part 1: General requirements," International Standard, IEC 60950-1, Edition 2.2, May 2013, pp. 62-122, 61 pages.
"Information technology equipment—Safety—Part 1: General requirements," International Standard, IEC 60950-1, Edition 2.2, May 2013, pp. 123-181, 59 pages.
"Information technology equipment—Safety—Part 1: General requirements," International Standard, IEC 60950-1, Edition 2.2, May 2013, pp. 182-253, 72 pages.
"Information technology equipment—Safety—Part 1: General requirements," International Standard, IEC 60950-1, Edition 2.2, May 2013, pp. 254-319, 66 pages.
"Information technology equipment—Safety—Part 1: General requirements," International Standard, IEC 60950-1, Edition 2.2, May 2013, pp. 320-377, 58 pages.
"Information technology equipment—Safety—Part 1: General requirements," International Standard, IEC 60950-1, Edition 2.2, May 2013, pp. 378-433, 56 pages.
"Information technology equipment—Safety—Part 1: General requirements," International Standard, IEC 60950-1, Edition 2.2, May 2013, pp. 434-490, 57 pages.

(56) References Cited

OTHER PUBLICATIONS

"Information technology equipment—Safety—Part 1: General requirements," International Standard, IEC 60950-1, Edition 2.2, May 2013, pp. 491-551, 61 pages.
"Information technology equipment—Safety—Part 1: General requirements," International Standard, IEC 60950-1, Edition 2.2, May 2013, pp. 552-622, 71 pages.
"Information technology equipment—Safety—Part 1: General requirements," International Standard, IEC 60950-1, Edition 2.2, May 2013, pp. 623-644, 24 pages.
"Low-voltage switchgear and controlgear—Part 1: General rules," International Standard, Amendment 2, IEC 60947-1, Edition 5.0, Sep. 2014, pp. 1-63, 65 pages.
"Low-voltage switchgear and controlgear—Part 1: General rules," International Standard, Amendment 2, IEC 60947-1, Edition 5.0, Sep. 2014, pp. 64-102, 41 pages.
Stephen Edelstein, "Updated 2016 Tesla Model S also gets new 75-kWh battery option," Internet Archive WayBack Machine, Green Car Reports, May 5, 2016, 3 pages.
Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.
"Audio/video, information and communication technology equipment—Part 1: Safety requirements," International Standard, IEC 62368-1, Edition 2.0, Feb. 2014, pp. 1-132, 134 pages.
"Audio/video, information and communication technology equipment—Part 1: Safety requirements," International Standard, IEC 62368-1, Edition 2.0, Feb. 2014, pp. 133-263, 131 pages.

\* cited by examiner

MULTI-PHASE PULSE POWER SHORT REACH DISTRIBUTION

CROSS REFERENCE TO RELATED APPLICATIONS

This application is a continuation of U.S. application Ser. No. 18/166,159, filed Feb. 8, 2023, which in turn is a continuation of U.S. application Ser. No. 16/805,580, filed Feb. 28, 2020, now U.S. Pat. No. 11,637,497, issued Apr. 25, 2023, the entirety of which is incorporated herein by reference.

TECHNICAL FIELD

The present disclosure relates generally to power and data distribution and more particularly, short reach power distribution.

BACKGROUND

Power over Ethernet (PoE) is a technology for providing electrical power over a wired telecommunications network from power sourcing equipment (PSE) to a powered device (PD) over a link section. Today's PoE systems have limited power capacity, which may be inadequate for many classes of devices. Systems being developed for higher power distribution on cables used for transmitting data over longer distances (e.g., one hundred meters or more) typically have to address transmission line effects and risks of cable faults that may be present in longer distance power and data distribution, whereas these effects may be reduced in short reach distribution (e.g., distances less than 50 meters) such as in a data center environment.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
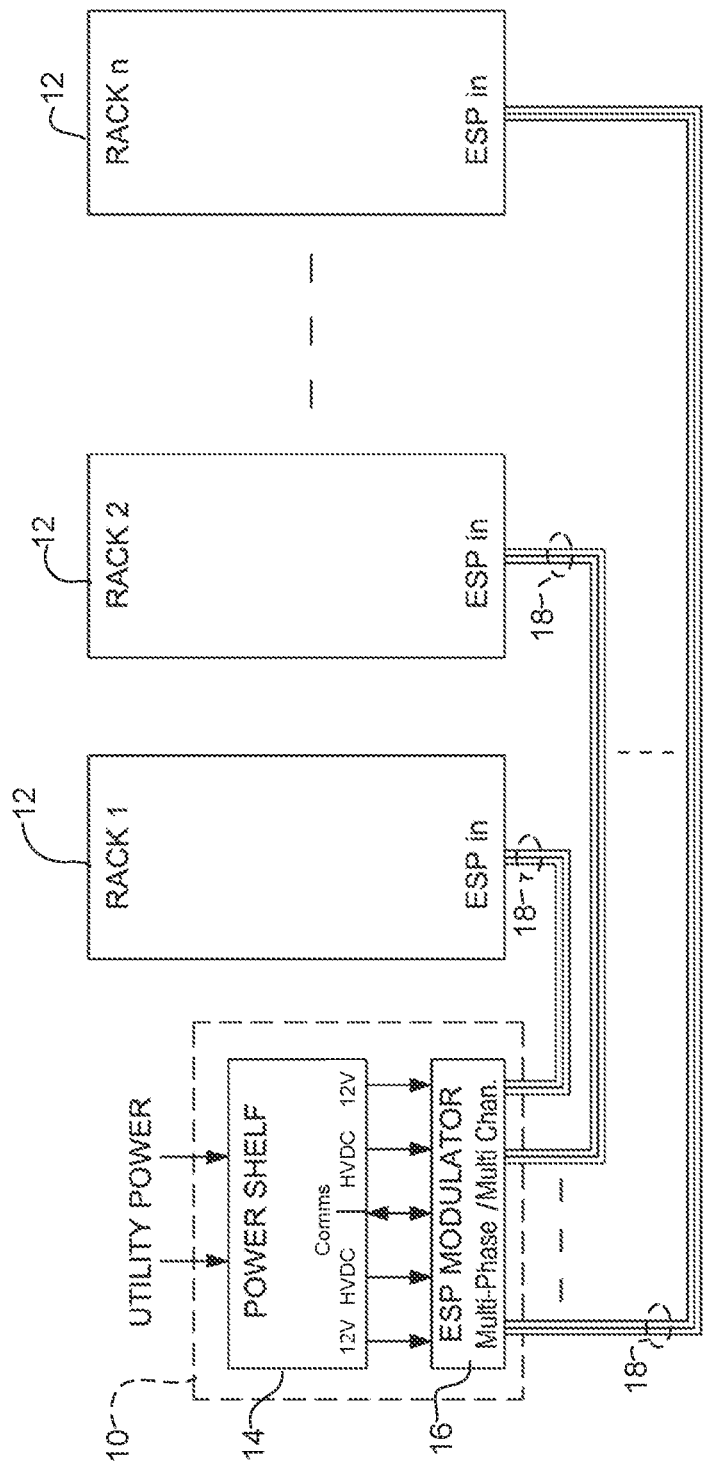
FIG. 1 is a block diagram illustrating rack power distribution, in accordance with one embodiment.

In one embodiment, a method generally comprises transmitting multi-phase pulse power from power sourcing equipment to a powered device in a data center, wherein the multi-phase pulse power comprises multiple phases of power delivered in a sequence of pulses defined by alternating low direct current voltage states and high direct current voltage states, and synchronizing the pulses at the power sourcing equipment with the pulses at the powered device.

In one or more embodiments, the power sourcing equipment transmits the multi-phase pulse power to a plurality of powered devices and wherein the powered devices are installed in one or more racks in the data center.

In one or more embodiments, the multi-phase pulse power is transmitted over a distance of less than fifty meters between the power sourcing equipment and the powered device.

In one or more embodiments, synchronizing the pulses at the power sourcing equipment with the pulses at the powered device comprises transmitting a synchronization signal out of band from the multi-phase pulse power.

In one or more embodiments, the multi-phase pulse power is transmitted on at least two wire pairs in a cable and synchronization information is transmitted on another wire in the cable.

In one or more embodiments, the multi-phase pulse power is transmitted on at least two Printed Circuit Board (PCB) traces on a PCB and synchronization information is transmitted on another trace on one of the PCB, another PCB, or an auxiliary cable.

In one or more embodiments, synchronizing the pulses comprising synchronizing a power sourcing equipment modulator switch with a powered device modulator switch for each of the multiple phases. In one or more embodiments, the method further includes controlling timing of the modulator and demodulator switches such that the each of the high direct current voltage states is turned on at the power sourcing equipment before a corresponding one of the high direct current voltage states is turned on at the powered device.

In one or more embodiments, the multi-phase pulse power comprises three phases operating at 67% duty cycle.

In one or more embodiments, each of the phases carries one-half of a powered device load current.

In one or more embodiments, the multi-phase pulse power comprises four phases with each of the phases carrying one-third of a powered device load current. In one or more embodiments, one of the four phases is lost and each of a remaining phase adjusts to carry one-half of the powered device load current.

In one or more embodiments, the multi-phase pulse power comprises three-phase pulse power transmitted from the power sourcing equipment to the powered device and wherein the three-phase pulse power is converted to two-phase pulse power at the powered device for powering a plurality of loads at the powered device.

In another embodiment, a method generally comprises receiving multi-phase pulse power at a powered device installed in a rack in a data center environment, wherein the multi-phase pulse power comprises multiple phases of power delivered in a sequence of pulses defined by alternating low direct current voltage states and high direct current voltage states, and transmitting the multi-phase pulse power to a plurality of loads at the powered device.

In yet another embodiment, a power distribution system generally comprises power sourcing equipment for transmitting multi-phase pulse power, wherein the multi-phase pulse power comprises multiple phases of power delivered in a sequence of pulses defined by alternating low direct current voltage states and high direct current voltage states, a powered device for receiving the multi-phase pulse power, and a cable for transmitting the multi-phase pulse power from the power sourcing equipment to the powered device over a distance less than fifty meters.

In one or more embodiments, the power distribution system further comprises an access point operable to receive the multi-phase pulse power from the power sourcing equipment and power an array of access points.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. Conventional PoE on communications cabling is generally limited to about 90 W (Watts) based on IEEE 802.3bt, but many classes of powered devices would benefit from power delivery greater than 100 W and in some cases greater than 300 W, 500 W, or even 1000 W.

In one or more embodiments, ESP (Extended Safe Power) may be used to supply higher power and data over an Ethernet cable. Power may be carried on the same conductors that carry data or power may be carried on dedicated conductors within the same cable or separate cables. While conventional PoE is generally limited to low power applications (e.g., ≤90 W), ESP may provide higher power with built in safety.

The term "Extended Safe Power" ("ESP") as used herein refers to high power (e.g., ≥100 Watts (W)), high voltage (e.g., ≥56 Volts (V)) operation with pulse power delivered on one or more wires or wire pairs in a cable (e.g., Ethernet cable), transmission line, bus bar, or power distribution system. In one or more embodiments, ESP includes fault detection (e.g., fault detection at initialization and between high voltage pulses), and pulse synchronization. Power is delivered from power sourcing equipment (PSE) to a powered device (PD). The power may be transmitted with communications (e.g., bidirectional communications) or without communications.

The term "pulse power" (or pulsed power) as used herein refers to power that is delivered in a sequence of pulses (alternating low direct current voltage states and high direct current voltage states) in which the voltage varies between a very small voltage (e.g., close to 0V, 3 VDC) during a pulse-off interval and a larger voltage (e.g., ≥12 VDC, ≥24 VDC) during a pulse-on interval. High voltage pulse power (e.g., ≥56 VDC, ≥60 VDC, ≥300 VDC, ~108 VDC, ~380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety.

In one or more embodiments, ESP may comprise pulse power transmitted in multiple phases in a multi-phase pulse power system with pulses offset from one another between wires or wire pairs to provide continuous power, as described below with respect to FIGS. 5-9. One or more embodiments may use multi-phase pulse power to achieve less loss, with continuous uninterrupted power with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety.

Multi-phase pulse power distribution systems in long distance (long reach) applications (e.g., >50 meters) may need to address transmission line effects and cable fault detection, which may be minimized in short reach (e.g., <50 meter distance) applications such as data center environments (rack and product level) or AP (Access Point) deployment. Data center and rack distribution systems, for example, have an advantage over long distance ESP, in that cable transmission line effects may be minimal or absent. Hence, pulse waveforms (described below with respect to FIG. 5) may remain essentially rectangular, thereby simplifying timing and filtering of the pulses at the powered device. In long reach distribution, voltage drop may cover a wide range, whereas short reach distribution provides improved efficiency with a much smaller voltage drop. This may allow, for example, use of more phases with controlled voltage coming out of a demodulator on the PD side. In short reach ESP distribution, continuous input current into the PD results in smooth DC voltage at the PD, thereby simplifying design and complexity of a PD power converter. Short reach ESP distribution also reduces the risk of cable faults, therefore, it may be acceptable in one or more embodiments to minimize fault detection and reduce complexity and lower cost of the ESP system. In one or more embodiments, fast current overload detection and shutdown may be used to provide effective overall protection from shock and hazard.

The embodiments described herein operate in the context of a data communications network including multiple network devices. As described in detail below, the network may comprise, for example, a data center comprising any number of network devices, which facilitate passage of data within the network. In one or more embodiments, the network may be configured for Power over Ethernet (PoE), Power over Fiber (PoF), advanced power over data, ESP, or any other power over communications system that is used to pass electrical power along with data to allow a single cable to provide both data connectivity (electrical data, optical data, or both electrical and optical data) and electrical power to network devices such as switches, routers, or other network devices.

Referring now to the drawings, and first to FIG. 1, implementation of short reach ESP rack power distribution in a data center is shown, in accordance with one embodiment. The power distribution system comprises power sourcing equipment (PSE) 10 transmitting multi-phase pulse power and a plurality of racks 12 (1, 2 . . . n) each comprising one or more powered devices (e.g., switch, router) (not shown) receiving the multi-phase pulse power. The PSE 10 may comprise, for example, a switch, router, central hub, or any other device operable to transmit multi-phase pulse power to a plurality of powered devices in a data center environment (e.g., short reach distribution). As described below with respect to FIG. 5, the multi-phase pulse power comprises multiple phases (e.g., two, three, four) of power delivered in a sequence of pulses defined by alternating low direct current (DC) voltage states and high direct current voltage states. In one or more embodiments, the multi-phase pulse power is transmitted over a cable extending from the PSE 10 to the powered device (rack 12) over a distance of less than fifty meters. As described below, power distribution at a rack level may be over a distance less than five meters and at a product level less than one meter. It is to be understood that the term PSE (Power Sourcing Equipment) as used herein refers to a device or component transmitting power. As previously noted, power may be transmitted over wires in a cable or bus bar structures in a line card, for example. In one or more embodiments, the PD (or components within the PD) may also transmit power to another network device or component, in which case the PD may also operate as a PSE with respect to a downstream device or component (PD) receiving the power.

In one or more embodiments, the multi-phase pulse power is transmitted on at least two Printed Circuit Board (PCB) traces on a PCB and synchronization information is transmitted on another trace on the PCB, another PCB, or an auxiliary cable. In one or more embodiments, the multi-phase pulse power may be distributed through a cable or bus bar, with the synchronization signal carried by a simple PCB trace.

The synchronization signal may be analog or digital. If the synchronization signal is analog, it may be used to drive PD isolation switches directly, thereby making the PD a purely analog device. In one example, the out of band synchronization signal comprises an analog waveform corresponding to a desired state of an isolation switch at the powered device.

The PSE 10 receives utility power (e.g., building power from a power grid, renewable energy source (solar power, wind power), generator, battery, AC (Alternating Current), HVAC (High Voltage AC), HVDC (High Voltage Direct Current), line card power (e.g., 48-56 VDC)). In the example shown in FIG. 1, power is received at a power shelf 14, which may comprise any number of power supply units, fan trays, and power outputs. The power shelf 14 shown in FIG. 1 comprises two HVDC outputs, two low voltage (e.g., 12V) outputs, and one bidirectional communications (Comms) channel. The power and communications links from the power shelf 14 are coupled to a multi-phase/multi-channel ESP modulator 16, which distributes power to and provides communications with PDs at the racks 12 over cables 18. The cable 18 may comprise two or more phases of pulse power carried over two or more wires (e.g., two or more wire pairs). In one or more embodiments, the cable comprises at least two wires (wire pairs) for distributing two-phase pulse power and at least one wire (wire pair) for bidirectional communications (e.g., out of band control channel). The control channel may be used, for example, for synchronization of pulses between the PSE and PD, initialization of higher power operation, control operations, fault indication, and the like.

It is to be understood that the system shown in FIG. 1 is only an example and that the ESP may be distributed within different network topologies. Also, the short reach ESP distribution may be at a rack or product level (e.g., between devices or components installed at one of the racks 12). At rack level, power required may dictate use of more than two phases of pulse power, whereas at the product level two phases of pulse power may provide sufficient power. At the rack level, the number of phases may be determined based on total power required and associated distribution power losses. At the product level, high voltage ESP distribution to individual high-power loads such as PoL (Point-of-Load) for ASICs may be provided as described below with respect to FIGS. 2A and 2B. At the rack or product level, ESP voltage level may be reduced to optimize PCB (Printed Circuit Board) spacing and power loss considerations.

Also, it is to be understood that the out of band control channel described herein is only one example. Control may also be provided in band (as described, for example, in U.S. patent application Ser. No. 16/671,508 referenced above). Thus, control signals may be transmitted out of band (e.g., on different wires or traces that are used to transmit power) or in band (e.g., on same wires used to transmit power).

Figure 2A:
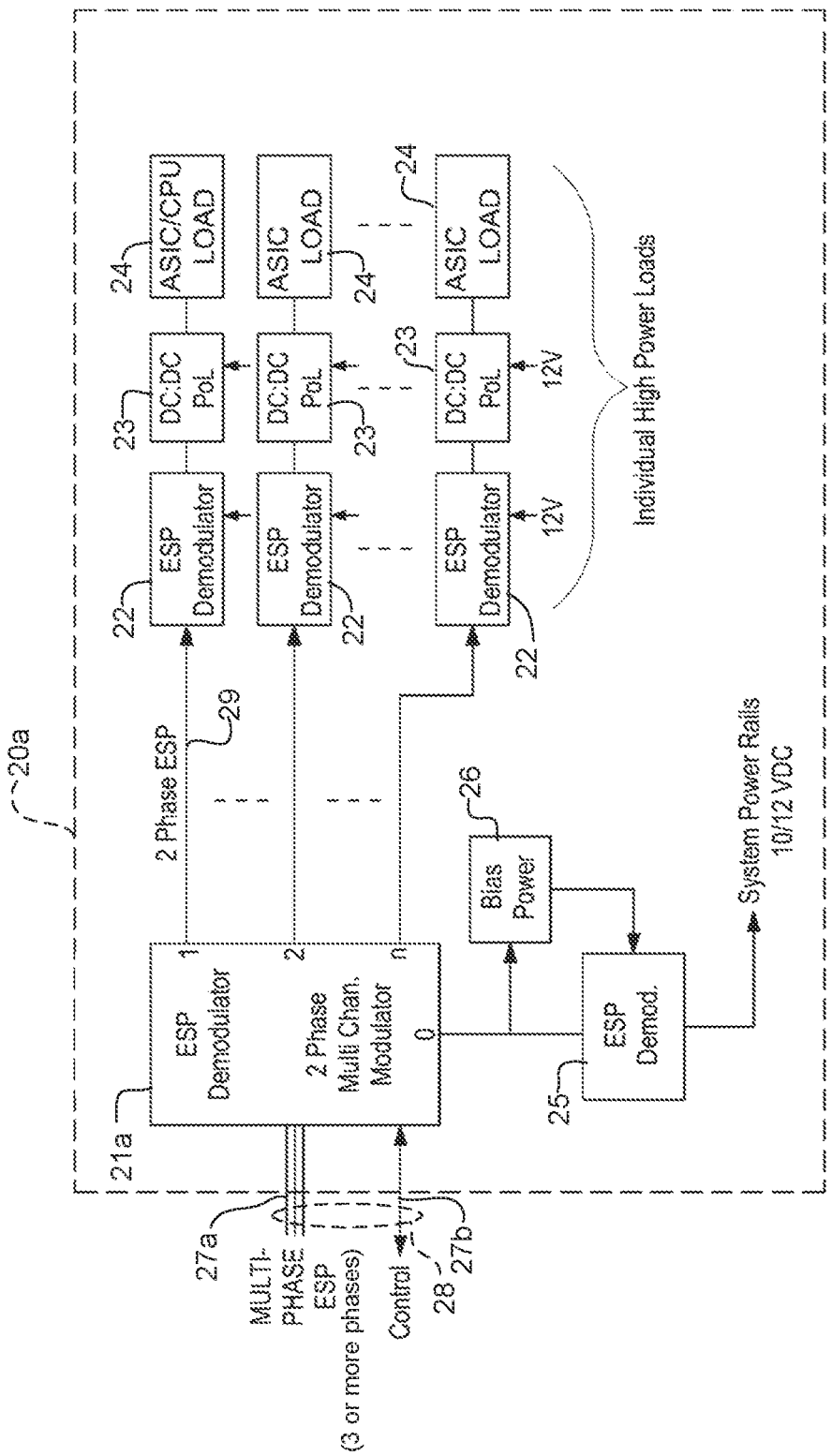
FIG. 2A is a block diagram illustrating a short reach power distribution platform, in accordance with one embodiment.
Figure 2B:
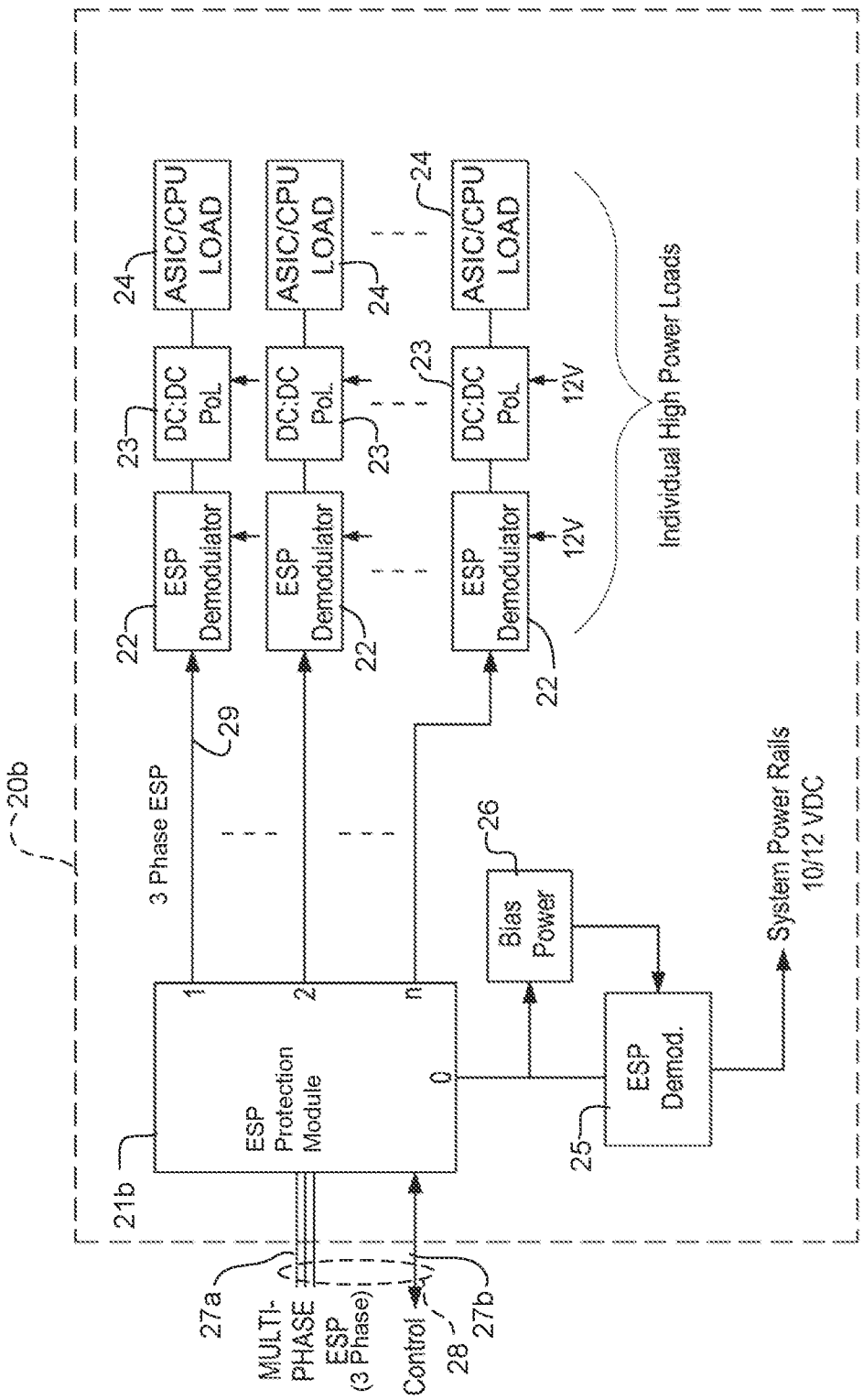
FIG. 2B is a block diagram illustrating another example of a short reach power distribution platform, in accordance with one embodiment.

FIGS. 2A and 2B are block diagrams of a short reach ESP platform at a powered device 20a, 20b, in accordance with one or more embodiments. Referring first to FIG. 2A, multi-phase ESP (e.g., three-phase ESP) is received at an ESP demodulator 21a comprising a two-phase multi-channel modulator. In the example shown in FIG. 2A, the multi-phase ESP is received on wires (e.g., three wire pairs 27a) in a cable 28 also comprising a wire (wire pair) 27b for receiving and transmitting bidirectional control communications. Two-phase ESP is transmitted from the ESP demodulator 21a to a plurality of individual high-loads, each comprising an ESP demodulator 22, a DC-DC converter and PoL (Point-of-Load) 23, and a load 24 (e.g., ASIC (Application-Specific Integrated Circuit), CPU (Central Processing Unit), or other electronic component (die, integrated circuit, chip, chiplet, optical engine, multi-chip module). The ASIC/CPU load may consume, for example, 1.2V and each ASIC load may consume, for example, 0.8V. Each PoL 23 may power any number of loads and the powered device may comprise any number of individual loads. In addition to receiving ESP at the ESP demodulator 22, the ESP demodulator may also receive 12V (or other low voltage power level (e.g., 10V)) from system power rails as shown transmitted from ESP demodulator 25 coupled to the primary ESP demodulator 21a with bias power 26. The low power may be used at system start-up for initialization and testing, for example.

In the example shown in FIG. 2B, a powered device 20b receives multi-phase pulse power (e.g., three-phase ESP) at an ESP protection module 21b, which delivers ESP with the same number of phases (e.g., three-phase ESP) as received at the PD.

The control data provided at 27b may include, for example, isolation switch synchronization, control data, modulator switch timing control, bidirectional control data, or other PSE/PD synchronization data.

In one or more embodiments, the multi-phase pulse power is transmitted on at least two Printed Circuit Board (PCB) traces on a PCB and synchronization information is transmitted on another trace on one of the PCB, another PCB or an auxiliary cable.

ESP distribution across a line card or motherboard (at the PD 20a, 20b) may be implemented through use of miniature bonded bus bar structures 29. For example, a bus bar structure utilizing 5 to 10 mil thick by 125 mil wide structures may be pre-formed to accommodate PCB component placement and avoid routing high voltage traces in the PCB, thereby reducing PCB layer count. At the rack/product level, ESP voltage may be reduced to optimize PCB spacing and power loss considerations.

Figure 3:
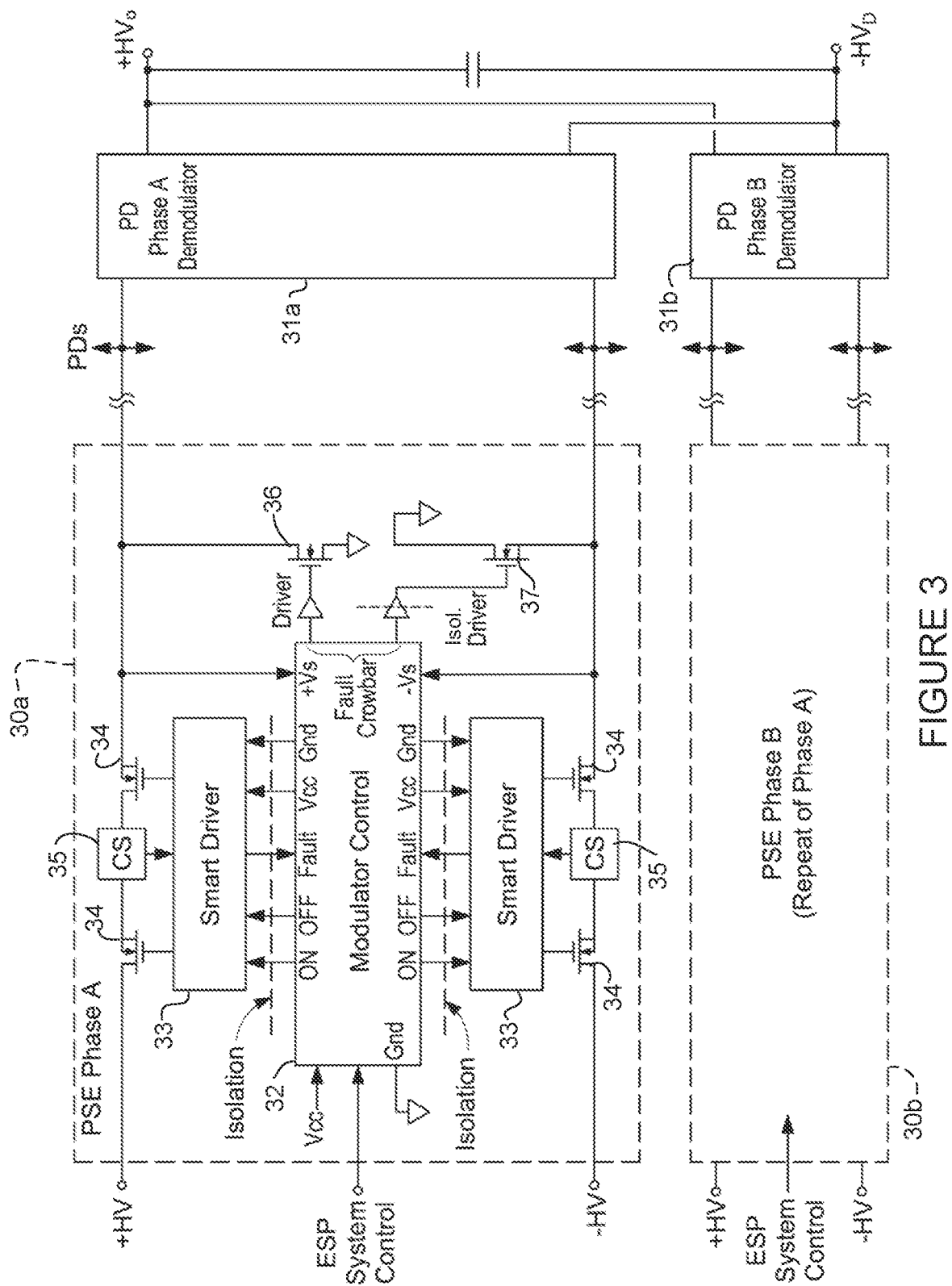
FIG. 3 is a block diagram illustrating two-phase short reach power distribution, in accordance with one embodiment.

FIG. 3 illustrates two-phase short reach ESP distribution, in accordance with one embodiment. In this example, the PSE comprises two phases (phase A, phase B). For simplification only details of phase A are shown. As previously described, high voltage power and ESP system control are received at PSE phase A 30a and PSE phase B 30b. In this example, a modulator controller 32 is in communication with two smart drivers 33, which drive isolation switches (modulator switches) 34. Isolation is provided between the smart driver 33 and the modulator controller 32. The switches 34 may comprise, for example, a solid-state switch or any other suitable device to provide pulse power modulation, which is synchronized between the PSE 30a, 30b and the PD 31a, 31b for each phase. The switches 34 may comprise any suitable actively controlled switching device capable of operation at the desired switching frequency, such as a Metal Oxide Semiconductor Field Effect Transistor (MOSFET), a Bipolar Junction Transistor (BJT), a Gallium Nitride Field Effect Transistor (GaNFET), or a solid-state relay (SSR). Closing and opening of the switch may be managed by control logic at the smart driver 33, which may be part of a processor, controller, or a separate integrated circuit.

A current sense (CS) element (e.g. transformer, resistor, or solid-state sensor) 35 may be located between the switches 34 or upstream of the switches, for example. The PSE may further include a safety sensing circuit (Vs). The system may be configured to perform one or more tests at start-up and during pulse-off time, which may include a cable capacitance test, line-to-ground shock protection, and line-to-line shock protection, for example, as described in U.S. patent application Ser. No. 16/671,508, referenced above. As shown in the example of FIG. 3, the PSE may include a fault crowbar/shorting relay for safety.

As described below with respect to FIG. 4A, the PD 31a, 31b also includes modulator switches. The switches operate to isolate the wire pair during high voltage pulse-off time for testing of the wires. The pulses may be synchronized using an out of band control channel, as previously described with respect to FIGS. 2A and 2B. The PSE further includes a driver 36 and isolated driver 37 (one or more switch) to provide a safety crowbar (line shorting) function. The modulator controller 32 may shut off power or switch to a low power mode upon identification of a fault in the circuit.

Figure 4A:
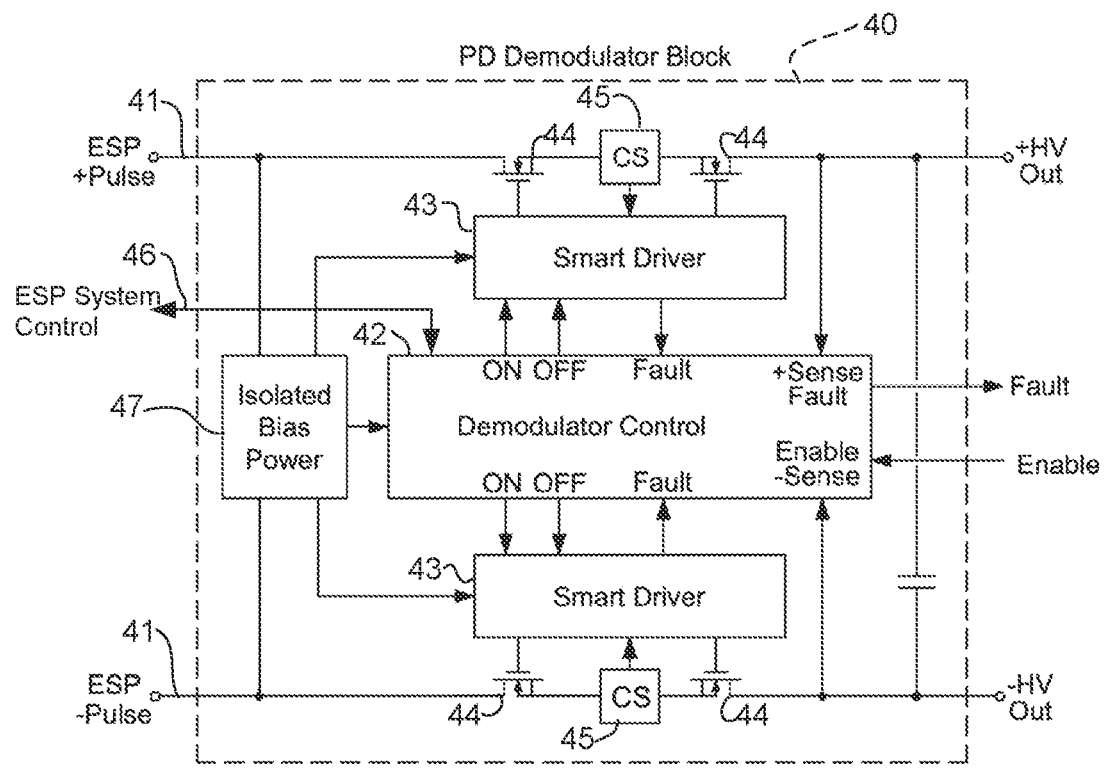
FIG. 4A is a block diagram illustrating a powered device demodulator for one phase of the multi-phase pulse power system, in accordance with one embodiment.

FIG. 4A illustrates details of a PD demodulator block 40, in accordance with one embodiment. As previously described with respect to FIGS. 2A and 2B, the PD receives ESP pulse power at wires 41 from the PSE and out of band ESP system control at wire (wires) 46. A demodulator controller 42 is in communication with two smart drivers 43 operable to control demodulator switches 44, as described above with respect to the PSE. The demodulator switches 44 are synchronized with the modulator switches 34 at the PSE (e.g., through out of band system control 46). Isolated bias power (e.g., 12V) 47 may be provided for use in housekeeping or testing. As previously described with respect to the PSE, current sense 45 and safety sensing are also provided at the PD.

Figure 4B:
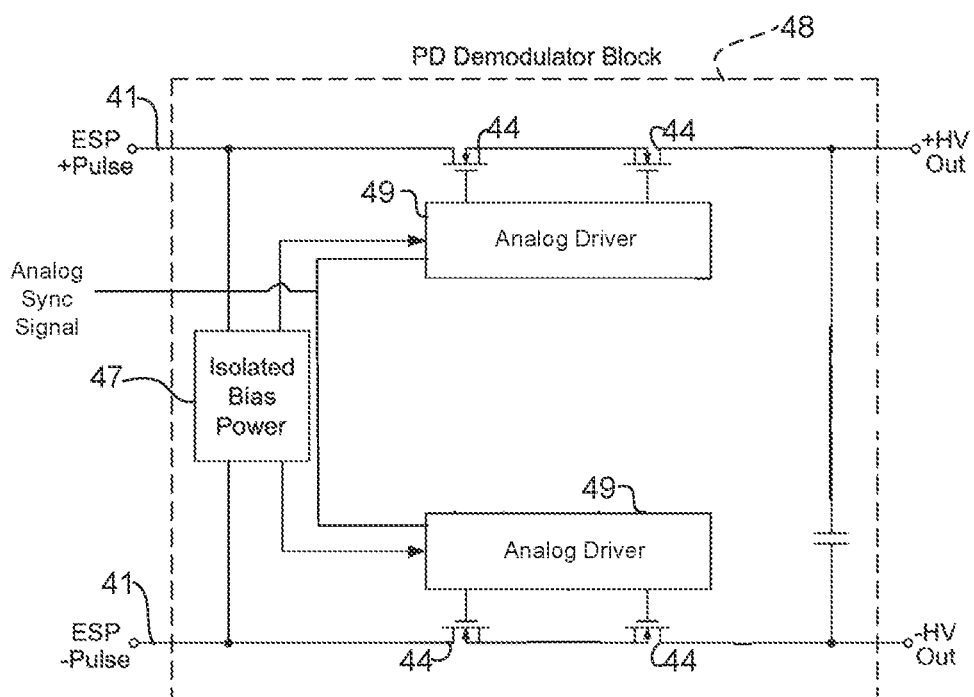
FIG. 4B is a block diagram illustrating a powered device demodulator for use with an analog synchronization signal.

FIG. 4B shows an example of PD demodulator block 48 configured for use with an analog synchronization signal. The analog signal is used to drive the PD isolation switches 44 directly through an analog driver 49. In this example, an out of band synchronization signal may comprise an analog waveform that corresponds to the desired state of the PD's isolation switches 44 at any moment in time.

It is to be understood that the systems shown in FIGS. 2A-4B are only examples and components may be added, removed, or rearranged, without departing from the scope of the embodiments. For example, as previously noted, an analog synchronization signal may be used to drive the PD isolation switches, thereby simplifying the PD configuration.

As previously described, power delivered by the power distribution system may comprise high voltage multi-phase pulse power (high voltage DC power). The multi-phase pulse power comprises a plurality of phases of pulse power, with the pulse power comprising a plurality of DC voltage pulses with the DC voltage pulses offset between phases to provide continuous power. FIGS. 5-9 schematically illustrate simplified examples of voltage and current in a two-phase, three-phase, and four-phase pulse power system.

Figure 5:
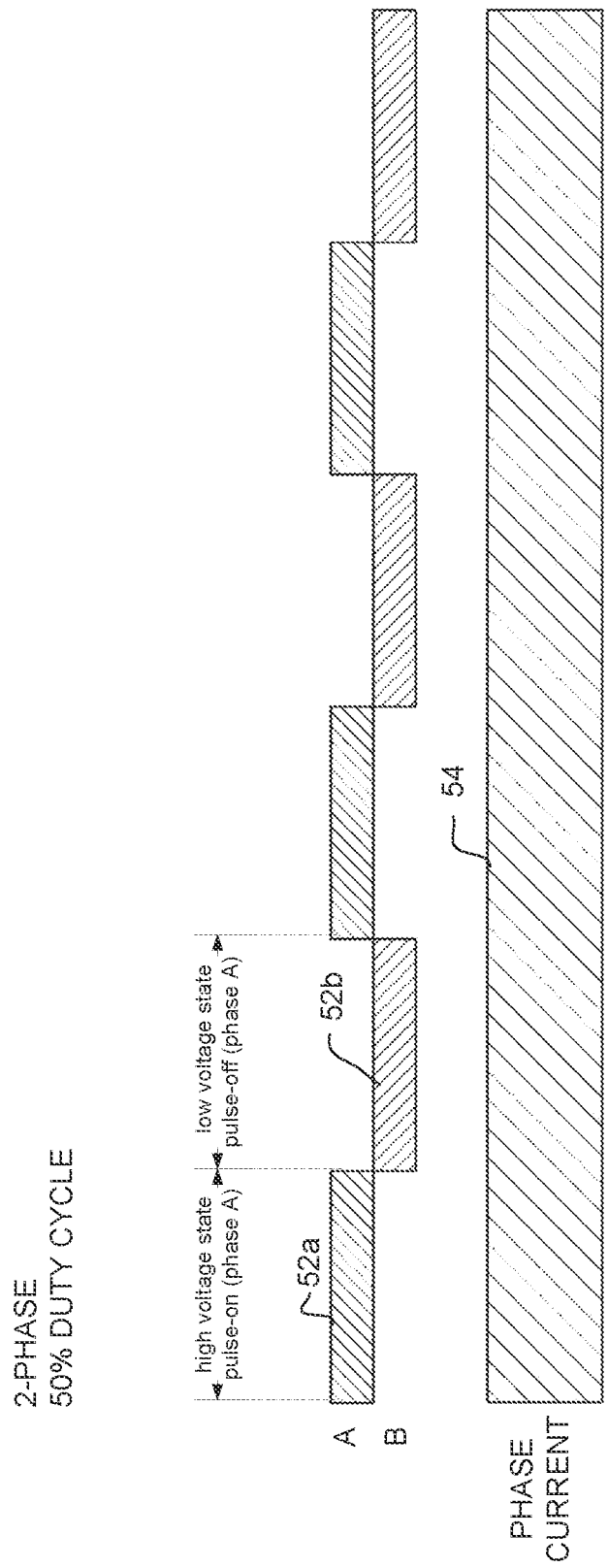
FIG. 5 illustrates two-phase operation in a short reach multi-phase pulse power distribution system, in accordance with one embodiment.

Referring first to FIG. 5, voltage for phase A is shown at 52a and voltage for phase B is shown at 52b. The continuous phase current is shown at 54. The pulse power for each phase comprises a plurality of voltage pulses defining alternating high voltage states and low voltage states. As shown in FIG. 5, the voltage is switched between a pulse on-time (e.g., voltage >24 VDC, voltage ≥60 VDC, voltage ≥380 VDC) and a pulse off-time (e.g., voltage <12V, ≤24V). During pulse-on time, high voltage power is delivered and during pulse-off time while the high voltage power is off, a low voltage may be applied on each phase for use in low voltage sensing to check wire integrity, test capacitance in the cable, or any other testing or fault detection. The voltage pulses are offset between phases to provide continuous power.

In one or more embodiments, a low power (e.g., 90 W-300 W) or short reach system may be configured as a two-phase pulse power system as shown in FIG. 5. In one example, the two-phases operate at 50% duty cycle on each phase so that net current into the PD is continuous, which may minimize filtering at the PD. Duty cycle or PD input current may be monitored, and the duty cycle actively adjusted to maintain continuous PD input current under varying distribution conditions.

The two-phase operation reduces hardware complexity and cost while still supplying essentially continuous DC current to the PD with minimal filtering. However, each phase carries 100% of the load current when conducting so the effective cable utilization is 50%, which may or may not be an issue depending on power level and length of cables.

In one or more embodiments, power may be transmitted in a single phase (e.g., only phase A of FIG. 5).

Figure 6:
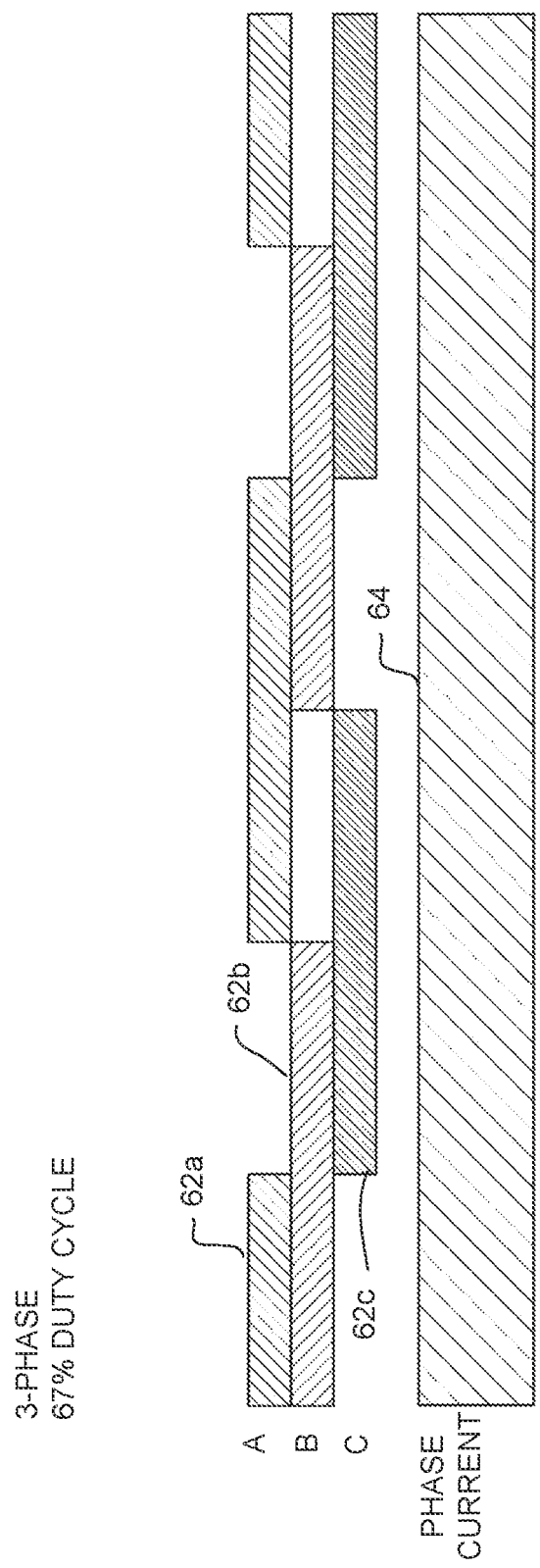
FIG. 6 illustrates three-phase operation in the short reach multi-phase pulse power distribution system, in accordance with one embodiment.

Data center installations may benefit from three-phase (or more) operation as individual pair currents are reduced and effective cable utilization is higher since more than one wire pair is carrying current at any instant. FIG. 6 illustrates an example of a three-phase system. Voltage for phase A is shown at 62a, voltage for phase B is shown at 62b, and voltage for phase C is shown at 62c. The continuous phase current is shown at 64. FIG. 6 illustrates three phase operation at 67% duty cycle, which results in continuous current supplied to the PD with each conducting pair carrying 50% of the PD load current with 67% cable utilization.

Figure 7:
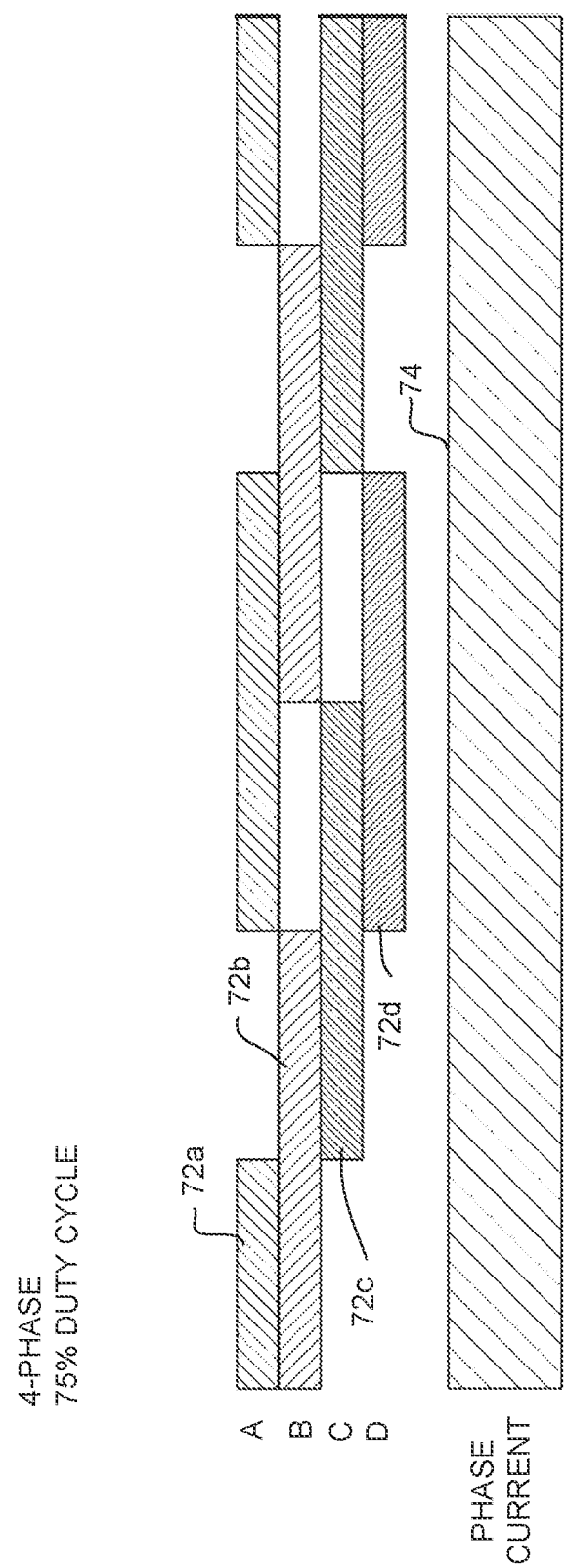
FIG. 7 illustrates four-phase operation in the short reach multi-phase pulse power distribution system, in accordance with one embodiment.
Figure 8:
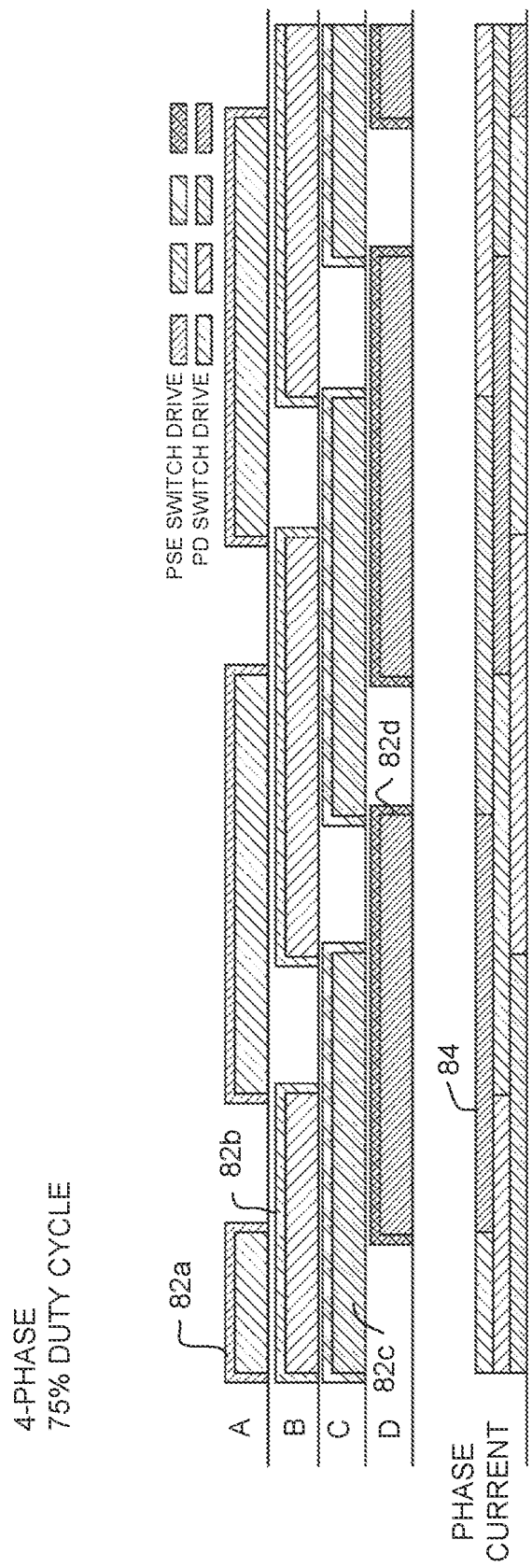
FIG. 8 illustrates switch drive timing the four-phase multi-phase pulse power distribution system, in accordance with one embodiment.

FIGS. 7 and 8 illustrate simplified voltage waveforms and phase current in a four-phase system with a 75% duty cycle, in accordance with one embodiment. In FIG. 7, voltage pulses are shown at 72a for phase A, 72b for phase B, 72c for phase C, and 72d for phase D. In FIG. 8, voltage pulses are shown at 82a for phase A, 82b for phase B, 82c for phase C, and 82d for phase D. The cumulative phase current is shown at 74 in FIGS. 7 and 84 in FIG. 8.

Four-phase operation may have particular application to cables corresponding to a standardized system such as TIA-568 Category cabling, since each wire pair carries only one-third of the total cable current. In one example, 22 AWG Cat 6 cable may carry approximately 2 kW with power loss of one-fourth percent per 10 m length with +/−190V pulses.

In one or more embodiments, the PSE switch drive may be turned on before the PD switch drive at the start of the pulse, and at the end of the pulse on interval the PD switch drive turned off before the PSE switch drive for each phase, as illustrated in FIG. 8. Timing control of the PSE and PD modulator and demodulator switches (control switches) may be performed such that the PSE switches (high DC voltage states) are turned on before the corresponding PD switches, and PD switches are turned off before PSE switches for each pulse. This technique may be used to minimize transients on the power distribution system, thereby reducing EMI and producing cleaner current waveforms for more accurate current detection.

Figure 9:
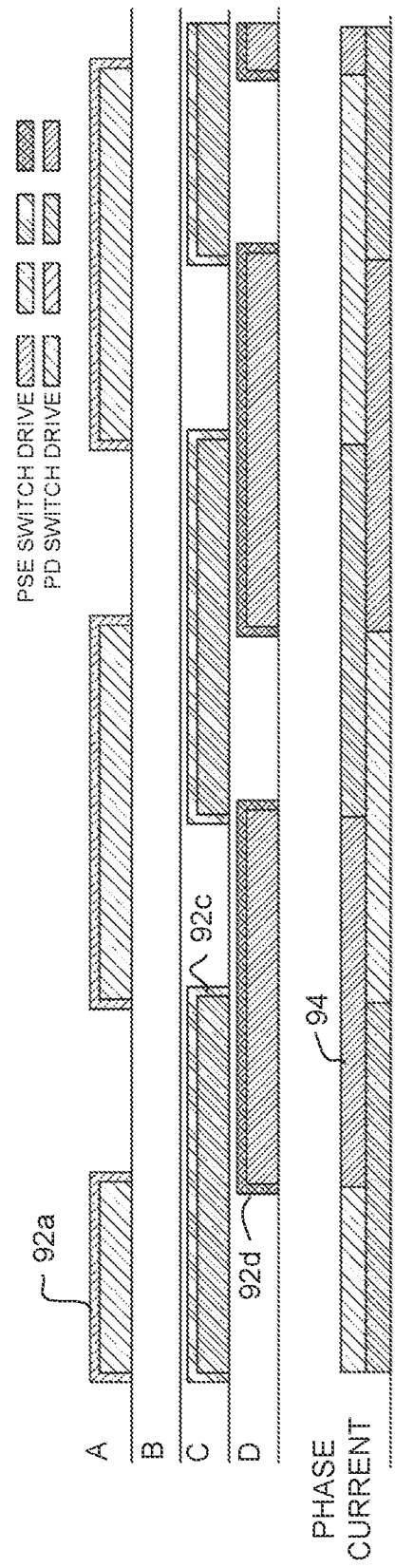
FIG. 9 illustrates operation of a four-phase pulse power system with one dropped phase, in accordance with one embodiment.

FIG. 9 illustrates operation with one dropped phase (phase B). Voltage pulses are shown at 92a for phase A, 92c for phase C, and 92d for phase D. The cumulative phase current is shown at 94. As can be seen in FIG. 9, continuous power is still provided, even with loss of phase B by adjusting the relative timing of the three functional phases. With active duty cycle adjustment, a four-phase pulse power system may compensate for the loss of a single phase by changing duty cycle from 75% to 67%, as shown in FIG. 9, to maintain continuous current into the PD. In this example, individual cable pair currents will increase from one-third to one-half of total PD input current. In one or more embodiments, load balancing may be performed over the remaining phases following the loss of one or more phases. The pulse width may be adjusted at one or more of the remaining phases following loss of the phase.

It is to be understood that the voltages, currents, and duty cycles shown in FIGS. 5-9 illustrate simplified examples with idealized waveforms. In one or more embodiments, the voltage during off-time is greater than zero for use in fault detection, as previously noted. For example, the voltage during pulse-off time may comprise a low voltage to provide for fault sensing during pulse-off time. Fault sensing may include, for example, line-to-line fault detection with low voltage sensing of the cable or powered device and line-to-ground fault detection with midpoint grounding. These power safety features provide for safe system operation and installation and removal (disconnect) of devices.

In one or more embodiments, center-point grounding of the ESP system may provide equal and opposite voltage transitions on each wire pair during pulse switching. This has a field cancellation effect, which minimizes radiated EMI (ElectroMagnetic Interference). Similarly, each conductor pair carries equal and opposite currents so magnetic field cancellation reduces external fields.

In one or more embodiments, the pulse-on time is greater than the pulse-off time. For example, the high voltage may be pulsed on for 4 ms and off for 1 ms. In another example, the high voltage may be pulsed on for 8 ms and off for 4 ms. Also, the voltage pulse-on times may overlap between phases so that at least one wire is on at any time. During phase overlap in the multi-phase system, the total cable current is shared across all ON wires. When the phases are combined at the powered device, the result is continuous DC voltage as shown by the phase current in FIGS. 5-9. As described in U.S. patent application Ser. No. 16/380,954, referenced above, the multi-phase system may comprise any number of phases, with any phase offset or overlap, or duty cycle.

Figure 10:
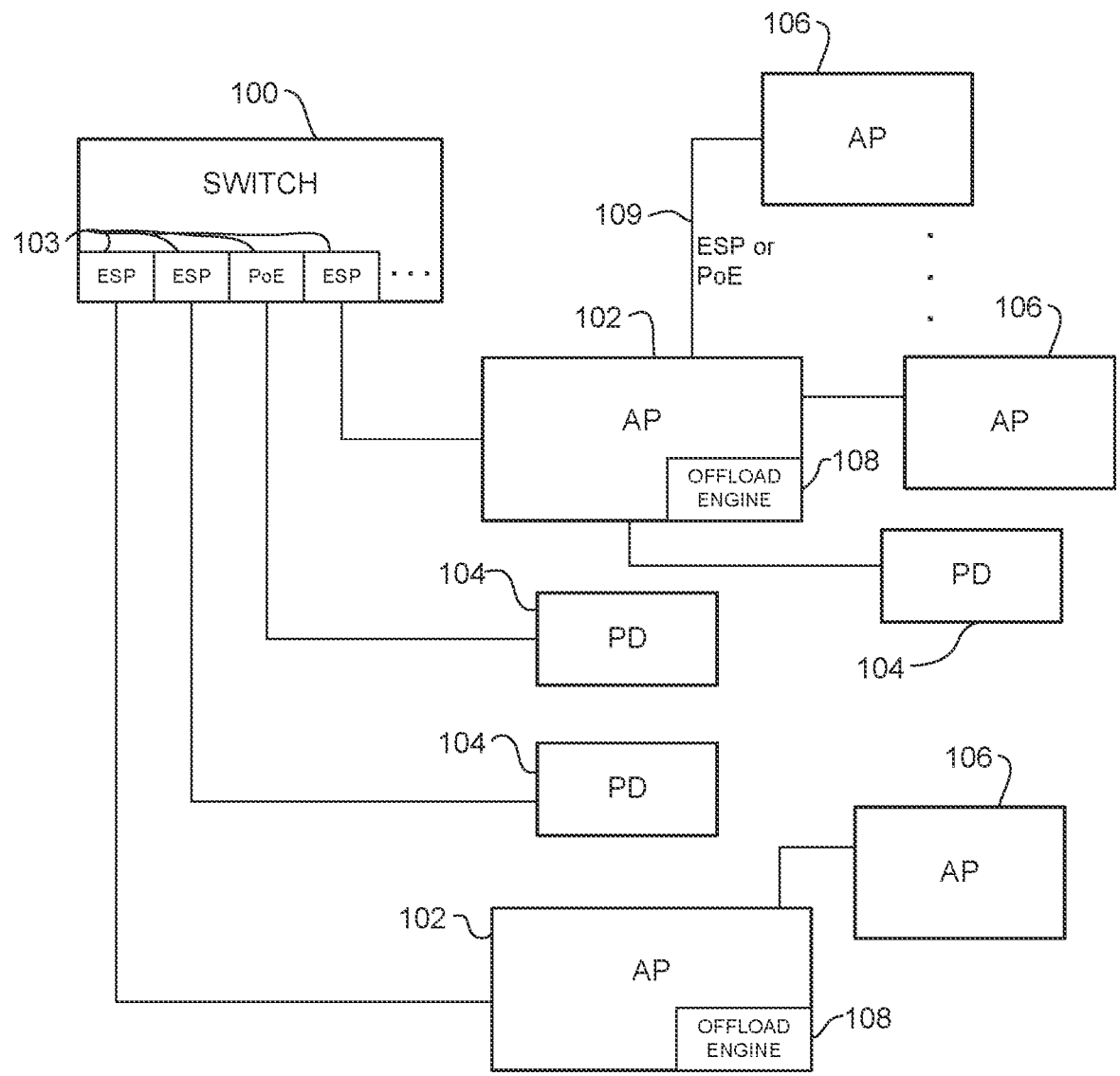
FIG. 10 is a block diagram illustrating use of the short reach power distribution for an AP (Access Point) array, in accordance with one embodiment.

FIG. 10 illustrates an example of a network in which short reach ESP distribution may be implemented, in accordance with one embodiment. In this example, ESP is provided at a switch 100 to power one or more APs (Access Points) 102 and powered devices (PDs) 104. The switch 100 comprises a plurality of ports (e.g., Ethernet ports) 103 that may be configured to delivery multi-phase HVDC pulse power (ESP) or conventional PoE. The switch 100 may select the type of power to be delivered based on a load at the end point or communications with the end point. A central AP 102 may drive one or more other APs 106 to form an AP array. The AP 102 may also power one or more PDs 104 (e.g., server). The AP 102 may receive multi-phase pulse power (ESP) from the switch 100 and deliver ESP or conventional PoE to one or more PDs 104 and AP 106. For example, power delivered from AP 102 to AP 106 over Ethernet cable 109 may be switched from PoE to ESP based on the power load at the AP 106, which may vary as the number of wireless devices (not shown) in communication with the AP 106 changes over time. If both the PSE (e.g., AP 102) and PD (e.g., AP 106) are capable of high power operation, the PSE, PD, or both PSE and PD may select an operating mode based on the most efficient delivery mode (e.g., using auto-negotiation between the PSE and PD). In one or more embodiments, the switch 100 is the only power source for the AP 102 (e.g., no external supplemental source such as a wall outlet).

In one or more embodiments, the AP 102 may include an offload engine 108 for a collaboration application (e.g., WebEx or other collaboration application). The offload engine 108 may offload processing to another device for one or more applications. The AP 102 may, for example, monitor operations performed by APs 106 and control power delivery accordingly.

It is to be understood that the simplified arrangement shown in FIG. 10 is only an example, and the switch 100 may be in communication with any number of PDs 104 or APs 102 and each AP may be in communication with (and power) any number of APs 106 or PDs. The topology may vary, for example, based on a size of a room or building and locations of the APs 102, 106. The APs 102, 106 each comprise one or more antennas and may be in wireless communication with any number of wireless devices, as is well known by those skilled in the art.

Figure 11:
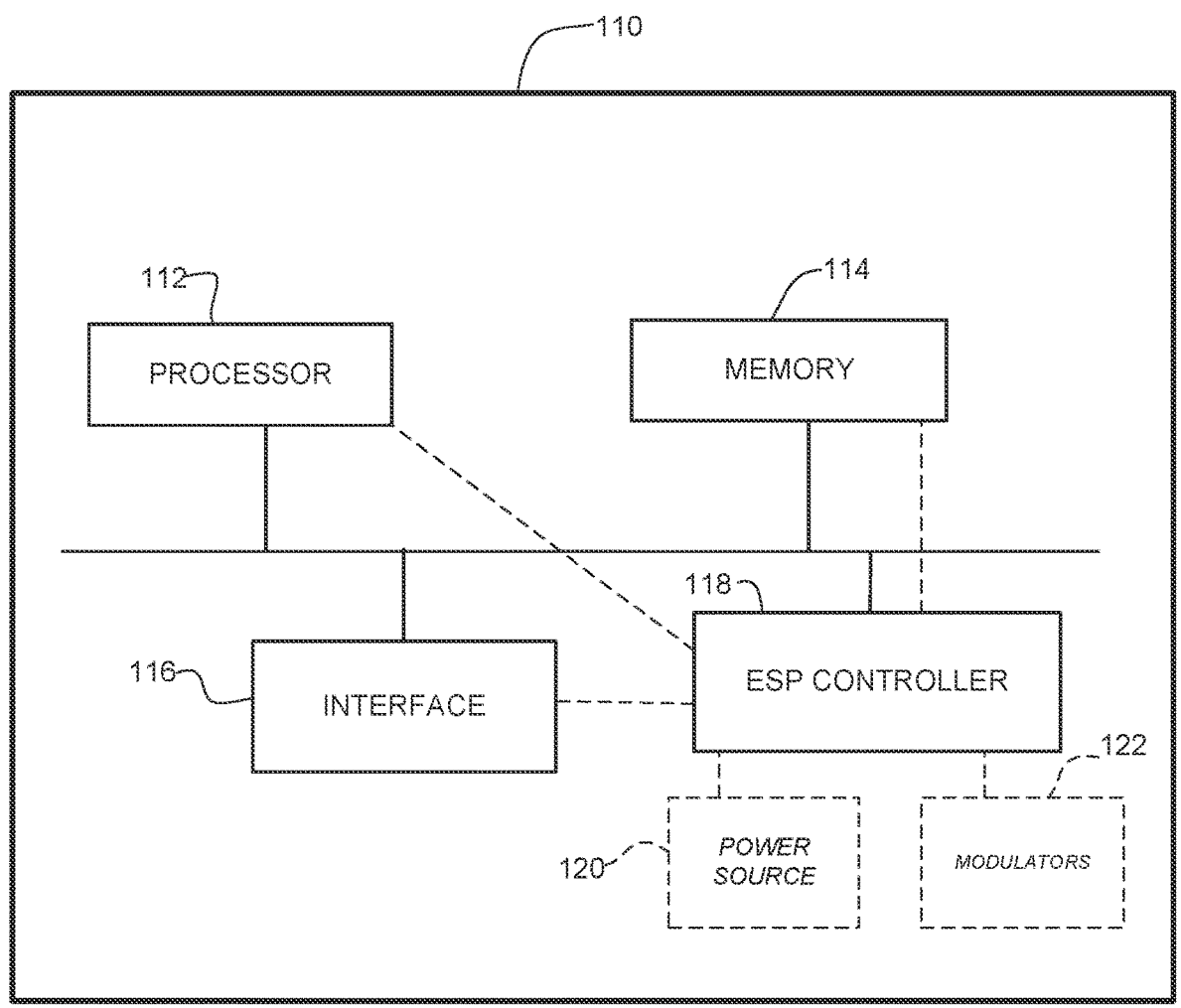
FIG. 11 is a block diagram illustrating a network device in which one or more embodiments may be implemented, in accordance with one embodiment.

FIG. 11 illustrates an example of a network device 110 that may be used to implement the embodiments described herein. In one embodiment, the network device 110 is a programmable machine that may be implemented in hardware, software, or any combination thereof. The network device 110 includes one or more processors 112, memory 114, interface 116, and ESP controller 118.

Memory 114 may be a volatile memory or non-volatile storage, which stores various applications, operating systems, modules, and data for execution and use by the processor 112. For example, components of the ESP controller 118 (e.g., code, logic, or firmware, etc.) may be stored in the memory 114. The network device 110 may include any number of memory components.

The network device 110 may include any number of processors 112 (e.g., single or multi-processor computing device or system), which may communicate with a forwarding engine or packet forwarder operable to process a packet or packet header. The processor 112 may receive instructions from a software application or module, which causes the processor to perform functions of one or more embodiments described herein.

Logic may be encoded in one or more tangible media for execution by the processor 112. For example, the processor 112 may execute codes stored in a computer-readable medium such as memory 114. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowcharts of FIGS. 12A and 12B. The network device 110 may include any number of processors 112.

The interface 116 may comprise any number of interfaces or network interfaces (line cards, ports, connectors) for receiving data or power, or transmitting data or power to other devices. The network interface 116 may be configured to transmit or receive data using a variety of different communications protocols and may include mechanical, electrical, and signaling circuitry for communicating data over physical links coupled to the network. For example, line cards may include port processors and port processor controllers. The interface 116 may be configured for PoE, ESP, PoF, or similar operation.

The ESP controller 118 is configured for receiving power from power source 120 and delivering pulse using modulator switches 122. The ESP controller 118 may include logic, firmware, software, etc. for use in selecting a type of power to deliver to each output. For example, the controller 118 may comprise hardware or software for use in power selection and may be programmable to deliver a selected type of power.

It is to be understood that the network device 110 shown in FIG. 11 and described above is only an example and that different configurations of network devices may be used. For example, the network device 110 may further include any suitable combination of hardware, software, algorithms, processors, devices, components, or elements operable to facilitate the capabilities described herein.

Figure 12A:
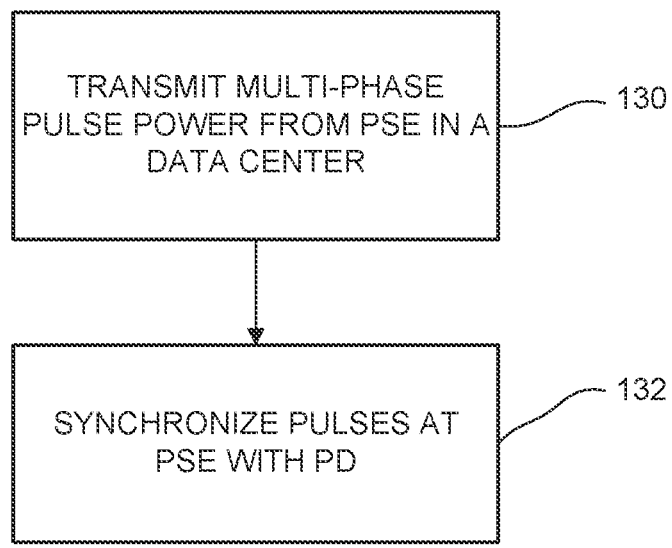
FIG. 12A is a flowchart illustrating an overview of a process for distributing multi-phase pulse power in a data center environment, in accordance with one embodiment.

FIG. 12A is a flowchart illustrating an overview of a process for transmitting multi-phase pulse power in a data center (e.g., short reach distribution), in accordance with one embodiment. Multi-phase pulse power comprising multiple phases of power delivered in a sequence of pulses defined by alternating low direct current voltage states and high direct current voltage states is transmitted from power sourcing equipment in a data center (step 130). The pulses are synchronized at the power sourcing equipment with pulses at a powered device (step 132). In one or more embodiments, pulse synchronization between modulator switches at the PSE and PD is performed over one or more wires separate from wires used to transmit power (e.g., on a side band (out of band) channel). This side band channel may also be used to identify faults detected during one or more safety tests (e.g., wire capacitance test, etc.).

Figure 12B:
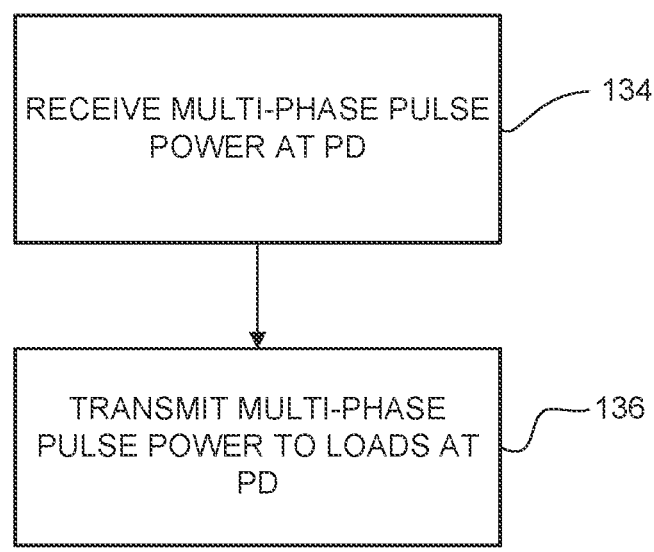
FIG. 12B is a flowchart illustrating an overview of a process for multi-phase pulse power distribution at a powered device, in accordance with one embodiment.

FIG. 12B is a flowchart illustrating an overview of a process for receiving and distributing multi-phase pulse power at a powered device, in accordance with one embodiment. Multi-phase pulse power comprising multiple phases of power delivered in a sequence of pulses defined by alternating low direct current voltage states and high direct current voltage states is received at a powered device installed in a rack in a data center environment (step 134). The multi-phase pulse power is transmitted to a plurality of loads (individual high-power loads (e.g., ASIC, CPU, etc. coupled to a PoL)) at the powered device (step 136). In one or more embodiments, the number of phases of pulse power received at the powered device may be different than the number of phases of pulse power transmitted to the individual high-power loads. For example, at the rack level, power required may dictate use of three-phase ESP, while at the product level, two-phase ESP may be an optimum approach. Short reach distribution at the rack level (e.g., less than five meters) and product level (e.g., less than one meter) may be used to effectively reduce distribution power losses while providing added safety and fire protection of ESP implementation. As previously noted, at the rack and product level, ESP voltage may be reduced to optimize PCB spacing and power loss considerations. In one or more embodiments, at the product level, one or more tests may be eliminated (e.g., touch protection, capacitance test) to provide limited safety testing if suitable protection is provided at the rack level. Thus, in one or more embodiments, safety testing performed at the rack level for the multi-phase pulse power (ESP) may be different than safety testing performed at the product level.

It is to be understood that the simplified processes shown in FIGS. 12A and 12B and described above are only examples and steps may be added, modified, or combined without departing from the scope of the embodiments.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
   transmitting multi-phase pulse power from power sourcing equipment to a powered device, wherein transmitting the multi-phase pulse power comprises transmitting, by the power sourcing equipment, multiple phases of power in a sequence of pulses defined by alternating low direct current power states and high direct current power states, wherein each of said multiple phases carries a portion of a load current to the powered device; and
   synchronizing the pulses at the power sourcing equipment with pulses at the powered device.

2. The method of claim 1, wherein the power sourcing equipment transmits said multi-phase pulse power to a plurality of powered devices and wherein the plurality of powered devices are installed in one or more racks.

3. The method of claim 1, wherein said multi-phase pulse power is transmitted over a distance of less than fifty meters between the power sourcing equipment and the powered device.

4. The method of claim 1, wherein said synchronizing the pulses at the power sourcing equipment with the pulses at the powered device comprises transmitting an out-of-band synchronization signal from said multi-phase pulse power.

5. The method of claim 4, wherein said out-of-band synchronization signal comprises an analog waveform corresponding to a desired state of an isolation switch at the powered device.

6. The method of claim 1, wherein said multi-phase pulse power is transmitted on at least two wire pairs in a cable and synchronization information is transmitted on another wire in the cable.

7. The method of claim 1, wherein said multi-phase pulse power is transmitted on at least two conductor pairs in a printed circuit board and synchronization information is transmitted on another conductor in the printed circuit board.

8. The method of claim 1, wherein synchronizing the pulses comprising synchronizing a power sourcing equipment modulator switch with a powered device demodulator switch for each of said multiple phases of power.

9. The method of claim 8, further comprising controlling timing of the power sourcing equipment modulator switch and the powered device demodulator switch such that each of the high direct current power states is turned on at the power sourcing equipment before a corresponding one of the high direct current power states is turned on at the powered device.

10. The method of claim 1, wherein said multi-phase pulse power comprises three phases operating at 67% duty cycle.

11. The method of claim 1, wherein transmitting comprises transmitting said multiple phases capable of carrying as much as one-half of the load current to the powered device.

12. The method of claim 1, wherein said multiple phases comprises four phases.

13. The method of claim 12, wherein when one of said four phases is lost, transmitting comprises transmitting each remaining phase to carry one-third of the load current to the powered device.

14. The method of claim 1, wherein said multi-phase pulse power comprises three-phase pulse power transmitted from the power sourcing equipment to the powered device and wherein said three-phase pulse power is converted to two-phase pulse power at the powered device for powering a plurality of loads at the powered device.

15. A power distribution system comprising:
power sourcing equipment configured to transmit multi-phase pulse power, wherein the multi-phase pulse power comprises multiple phases of power transmitted in a sequence of pulses defined by alternating low direct current power states and high direct current power states, wherein each of said multiple phases carries a portion of a load current;
a powered device that receives said multi-phase pulse power; and
a cable that transports said multi-phase pulse power from the power sourcing equipment to the powered device.

16. The power distribution system of claim 15, wherein the cable comprises at least two wire pairs for carrying at least two of said multiple phases and at least one wire for carrying a control signal comprising pulse synchronization information for synchronizing the pulses at the power sourcing equipment with the pulses at the powered device.

17. The power distribution system of claim 15, further comprising an access point configured to receive said multi-phase pulse power from the power sourcing equipment and power an array of access points.

18. The power distribution system of claim 17, wherein the access point is configured to transmit one of said multi-phase pulse power and Power over Ethernet (POE) to each access point in said array of access points.

19. A method comprising:
transmitting pulse power from power sourcing equipment to a powered device, wherein the pulse power is transmitted in a sequence of pulses defined by alternating low direct current power states and high direct current power states, wherein the pulse power is multi-phase pulse power comprising multiple phases each carrying a portion of a load current; and
synchronizing the pulses at the power sourcing equipment with pulses at a powered device, wherein said synchronizing the pulses at the power sourcing equipment with the pulses at the powered device comprises transmitting a synchronization signal that is out-of-band from the multi-phase pulse power.

20. The method of claim 19, wherein the synchronization signal comprises an analog waveform corresponding to a desired state of an isolation switch at the powered device.

21. The method of claim 19, wherein the pulse power is transmitted on at least two wire pairs in a cable and the synchronization signal is transmitted on another wire in the cable.

22. The method of claim 19, wherein the pulse power is transmitted on at least two Printed Circuit Board (PCB) traces on a PCB and synchronization information is transmitted on another trace on one of the PCB, another PCB, or an auxiliary cable.

* * * * *